United States Patent
Finkelstein et al.

(10) Patent No.: US 10,488,197 B2
(45) Date of Patent: Nov. 26, 2019

(54) METHOD AND APPARATUS FOR ASSISTING IN TILING

(71) Applicant: CCT CREATIVE CONSTRUCTION TOOLS LTD., Kfar Saba (IL)

(72) Inventors: Eyal Finkelstein, Raanana (IL); Ohad Falik, Kfar Saba (IL)

(73) Assignee: CCT CREATIVE CONSTRUCTION TOOLS LTD., Kfar Saba (IL)

( * ) Notice: Subject to any disclaimer, the term of this patent is extended or adjusted under 35 U.S.C. 154(b) by 30 days.

(21) Appl. No.: 15/318,696

(22) PCT Filed: Jun. 15, 2015

(86) PCT No.: PCT/IL2015/050601
§ 371 (c)(1),
(2) Date: Dec. 14, 2016

(87) PCT Pub. No.: WO2015/193883
PCT Pub. Date: Dec. 23, 2015

(65) Prior Publication Data
US 2017/0122735 A1    May 4, 2017

Related U.S. Application Data

(60) Provisional application No. 62/012,391, filed on Jun. 15, 2014.

(30) Foreign Application Priority Data

Jun. 15, 2014   (IL) .......................................... 233145

(51) Int. Cl.
*G01C 15/00* (2006.01)
*E04F 21/20* (2006.01)

(52) U.S. Cl.
CPC ............ *G01C 15/006* (2013.01); *E04F 21/20* (2013.01)

(58) Field of Classification Search
CPC .............................. E04F 21/20; G01C 15/006
(Continued)

(56) References Cited

U.S. PATENT DOCUMENTS 3,857,639 A    12/1974  Mason
4,891,888 A *  1/1990  Maria De Bree ....... E04F 21/24
                                            33/293
(Continued)

FOREIGN PATENT DOCUMENTS

CN          2509562 Y        9/2002
CN        201476784 U        5/2010
(Continued)

OTHER PUBLICATIONS

International Search Report & Written Opinion for PCT/IL2015/050601 Completed Sep. 7, 2015; dated Sep. 16, 2015 10 Pages.
(Continued)

*Primary Examiner* — Yaritza Guadalupe-McCall
(74) *Attorney, Agent, or Firm* — Eva Taksel

(57) ABSTRACT

A device for positioning a tile, comprising: a beam reader for receiving a laser beam within a predetermined range of locations, and providing a height indication; a level for providing a tilt indication of a tilt of the device; a processor for receiving the height and tilt indications, and combining them for determining gradient and height of a part of the tile; a display component for displaying in at least two dimensions positioning information for the device, the positioning information relating to the gradient and height of the tile part, as obtained by combining the height and tilt indications, wherein the beam being received at a predetermined location within the range of locations, and the level indi-
(Continued)

cating that the device is at a predetermined tilt, provides that the tile being positioned is at a required height, and wherein the device is adapted to be stably placed on the tile.

20 Claims, 10 Drawing Sheets

(58) Field of Classification Search
USPC .............................. 33/527, DIG. 20, DIG. 21
See application file for complete search history.

(56) References Cited

U.S. PATENT DOCUMENTS

| | | | |
|---|---|---|---|
| 5,446,968 A | 9/1995 | Okaniwa et al. | |
| 6,202,312 B1 * | 3/2001 | Rando | G01C 15/004 33/227 |
| 7,003,890 B2 * | 2/2006 | Kavounas | E04F 21/1844 33/286 |
| 7,426,451 B2 * | 9/2008 | Binder | B23Q 17/2428 700/302 |
| 7,676,939 B2 * | 3/2010 | Scheyer | G01C 15/004 33/276 |
| 7,979,993 B2 * | 7/2011 | Tippett | G01C 25/00 33/228 |
| 8,209,874 B1 * | 7/2012 | Tribble | G01C 15/06 33/227 |
| 8,418,373 B2 * | 4/2013 | Swanson | G01B 5/004 33/1 G |
| 8,991,062 B2 * | 3/2015 | Atkinson | G01B 11/26 33/263 |
| 2005/0274029 A1 * | 12/2005 | Kavounas | E04F 21/1844 33/286 |
| 2011/0126416 A1 * | 6/2011 | Swanson | G01B 5/004 33/527 |
| 2017/0122735 A1 * | 5/2017 | Finkelstein | G01C 15/006 |

FOREIGN PATENT DOCUMENTS

| | | |
|---|---|---|
| DE | 102015112516 A1 | 2/2016 |
| EP | 2199739 A1 | 6/2010 |

OTHER PUBLICATIONS

Examination Report of the European Patent office dated Feb. 22, 2019.

* cited by examiner

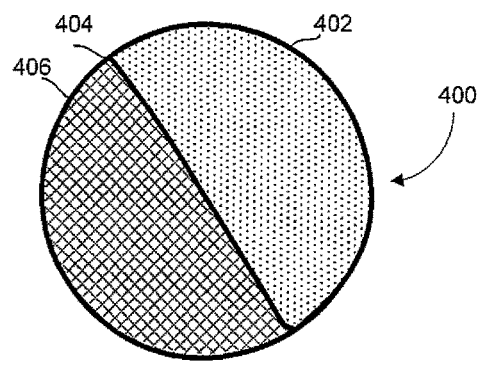
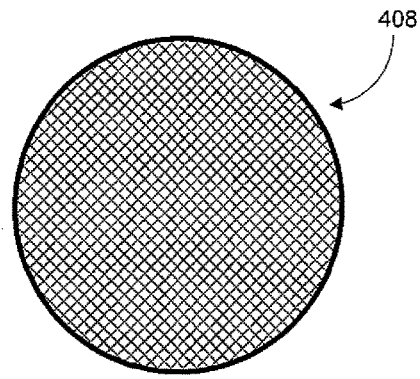
FIG. 4A  FIG. 4B
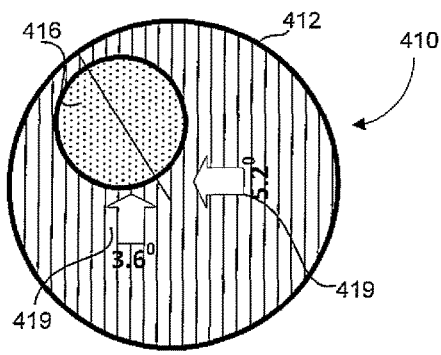
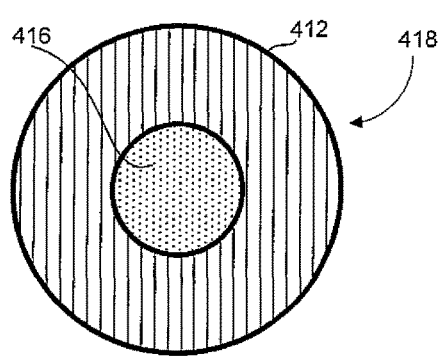
FIG. 4C  FIG. 4D
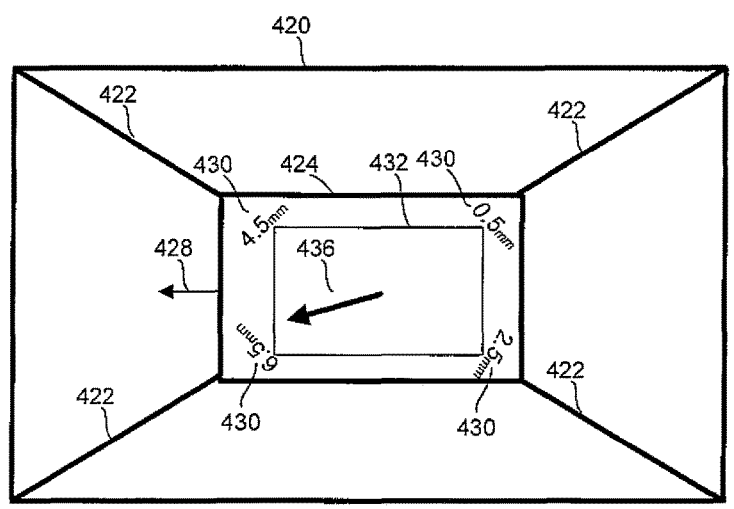
FIG. 4E

METHOD AND APPARATUS FOR ASSISTING IN TILING

CROSS-REFERENCE TO RELATED APPLICATIONS

This application is a national phase of PCT Patent Application No. PCT/IL2015/050601, filed Jun. 15, 2015, which claims the benefit of priority of U.S. Provisional Patent Application No. 62/012,391, filed Jun. 15, 2014 and Israel Patent No. 233145, filed Jun. 15, 2014, entitled METHOD AND APPARATUS FOR ASSISTING IN TILING. The contents of the above applications are all incorporated by reference as if fully set forth herein in their entirety.

TECHNICAL FIELD

The present disclosure relates to tiling in general, and to an apparatus and method for assisting in tiling surfaces, in particular.

BACKGROUND

Tiling generally refers to full or partially laying tiles over a surface. The surface may be planar such as a horizontal plane, a vertical plane or an inclined plane, or non-planar.

The traditional work process when tiling a planar area is started by marking leading lines along two axes of the area, denoted for example X and Y. The guiding lines may be marked using any device such as a laser pointer, a thread, or the like. A tile is then placed at the intersection of the lines. The tile is placed at a particular height, as the tiler sees fit or in accordance with a mark or a feature of the area to be tiled. The level of the tile may be verified using any level device, such as a water level, optical or laser measuring equipment or the like.

The next tile should then be laid adjacent to the first tile, preferably along one of the leading lines, wherein the two tiles have adjacent edges, with or without a spacer therebetween, and similarly for the following tiles. All tiles should be laid leveled, and their height should be the same as the height of the first tile. The level placement and uniform height may be verified using means such as a bubble level or a combination of a bubble level and a ruler, or any other means. In some cases a tiler may use a ruler to make sure that two or more tiles are all at the same height. It will be appreciated that the longer the ruler, the more tiles can be aligned. Tilers sometime carry and use a number of rulers in various lengths for ensuring uniform height and leveling along a varying number of tiles, and for working in rooms of different sizes. In any of the methods, alignment of the tiles with the desired plan is done based on the first tile height, and adjusting the level to the tile adjacent to the tile being currently laid or one or more tiles away.

When placing a tile, the tiler spreads adhesive mortar on the tile and/or the surface being tiled to be used as substrate. The adhesive mortar may be made of material such as thin-set mortar or other suitable glue. The tiler places the tile on the substrate and knocks or bumps using a rubber hammer or similar tool, on the tile to compact the filling material and lower the tile to its final position at the same level and plan as an adjacent previously laid tile. If at a certain time the tile descends too low, the tiler has to remove it and start over. The tiler may knock on the tile at its middle or on any other location such as any corner.

In other tiling methods, a substrate of sand is prepared as a foundation without an adhesive material, and the tile is being placed on top of the substrate without being knocked to place. The tile is then held at the position by its weight and the neighboring tiles.

Since a tiler does most of the task while kneeling, it will be appreciated that the tiler generally works his way backwards, starting on one end of the room and proceeding towards the other end, to avoid moving a pre-laid tile when placing an adjacent one, e.g., by standing on it, due to shift of the filling material before it is dried.

This traditional process has a number of disadvantages.

First, the process is highly subject to accumulated errors. Since every tile is placed relatively to a previously laid tile, even a small shift between two adjacent tiles caused for example by inexact reading of the bubble level, may accumulate to a significant and unacceptable error over a longer stretch such as the full length of the area.

Second, the process is sometime inapplicable to different types of tiles. One such type may be tiles with non-flat surface or with distortions, such as tiles of cut or split natural materials also known as sawed dimension stone, for example marble, or slate.

Third, a tiler may need to carry and work with a multiplicity of tools such as different rulers, which makes the work cumbersome and may be problematic in small spaces, or when tiling with non-rectangular shapes, sometime referred to as tessellate shapes, for example hexagons.

It will be appreciated that the errors caused by the reasons mentioned above, and possible other reasons, are additive. Thus a particular task can end up with poor results due to limitations of the tiles, the available tools and the work process.

BRIEF SUMMARY

One exemplary embodiment of the disclosed subject matter is a device for positioning a tile, comprising: a beam reader for receiving a laser beam from a beam emitter within a predetermined range of locations, the beam reader providing a height indication; a level for providing a tilt indication of a tilt of the device; a processor for receiving the height indication from the beam reader, and the tilt indication from the level, and combining the height indication and the tilt indication for determining a gradient and a height of at least one part of the tile; a display component for displaying to a user of the device in at least two dimensions, positioning information for the device, wherein the positioning information relates to the gradient and the height of the at least one part of the tile, as obtained by combining the height indication and the tilt indication, wherein the beam being received at a predetermined location within the range of locations, and the level indicating that the device is at a predetermined tilt, provides that a tile being positioned is at a required height, and wherein the device is adapted to be stably placed on the tile. The device may further comprise kickstands for setting a tilt angle of the device relatively to the tile. The device may further comprise two or more arms for setting the device on the tile. Within the device, the arms are optionally extendable. Within the device, each arm is optionally at least partially surrounded by a rigid sleeve distanced from the arm by a soft ring. Within the device, the level is optionally an electronic level for measuring an angle between the device and a vertical line. Within the device, the predetermined location is optionally adjusted in accordance with the angle. Within the device, the measurement is optionally done continuously. Within the device, the level is optionally an electronic level for measuring an angle between the device and a vertical line and the predetermined location is adjusted in accordance with the angle. The device may further comprise a feedback component for indicating to a tiler whether the device is leveled or whether the beam is received at the predetermined height. Within the device, the feedback is optionally a visual feedback indicating how the tile is to be tilted. Within the device, the feedback is optionally an audio feedback indicating whether the tile is at a correct height. The device may further comprise a hook for stabilizing the device against a tile to be positioned substantially vertical. The device may further comprise a beam emitter, wherein the device and the beam emitter are adapted to be calibrated such that the beam emitter emits the beam at the predetermined height. The device may further comprise a beam rotating mechanism for rotating the beam over a horizontal plane; a distance or angle measurement unit for assessing a geometric relationship between the device and the beam emitter, by detecting a time at which the beam hits the reader, and the angle at the time of the hitting; and a height measurement unit for determining a height of the tile. Within the device, each of the device and the beam emitter optionally comprises a communication component for communicating with the beam emitter or the device, respectively, or with an external computing platform. Within the device, a target position of the tile is optionally on a non-flat surface to be tiled. Within the device, the positioning information is optionally relative to a target position of the tile, the target position comprising a height and tilt, the height and tilt depending on a location of the tile within the surface. Within the device, the location of the tile within the surface is optionally determined using triangulation with reference to two points or one point and an angle. The device my further comprise an ultrasonic emitter or receiver for determining distance between two points.

Another exemplary embodiment of the disclosed subject matter is a device for positioning a tile, comprising: a beam emitter for emitting a beam; a beam reader for receiving the beam and determining whether the beam is received at a predetermined height; a level for determining an angle of the device relatively to a surface the device is placed on; two or more extendable arms for setting the device on the tile; a feedback component for providing a visual or auditory feedback to a tiler whether the device is leveled or whether the beam is received at the predetermined height; and a hook for stabilizing the device against a tile to be positioned substantially vertical.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. The Figure are generally not o scale and unless indicated otherwise, the drawings provide exemplary embodiments or aspects of the disclosure and do not limit the scope of the disclosure. In the drawings:

FIGS. 4A, 4B, 4C, 4D and 4E are schematic drawings of computerized displays showing how to tilt a tile, in accordance with some embodiments of the disclosure;

DETAILED DESCRIPTION

The disclosure relates to a device for laying tiles in a required height and inclination, such that setting each tile is done in an absolute manner, rather than relatively to an adjacent tile.

In order to provide a full picture of the device, including its construction and usage, a description of a traditional tiling workflow is provided first.

Figure 1:
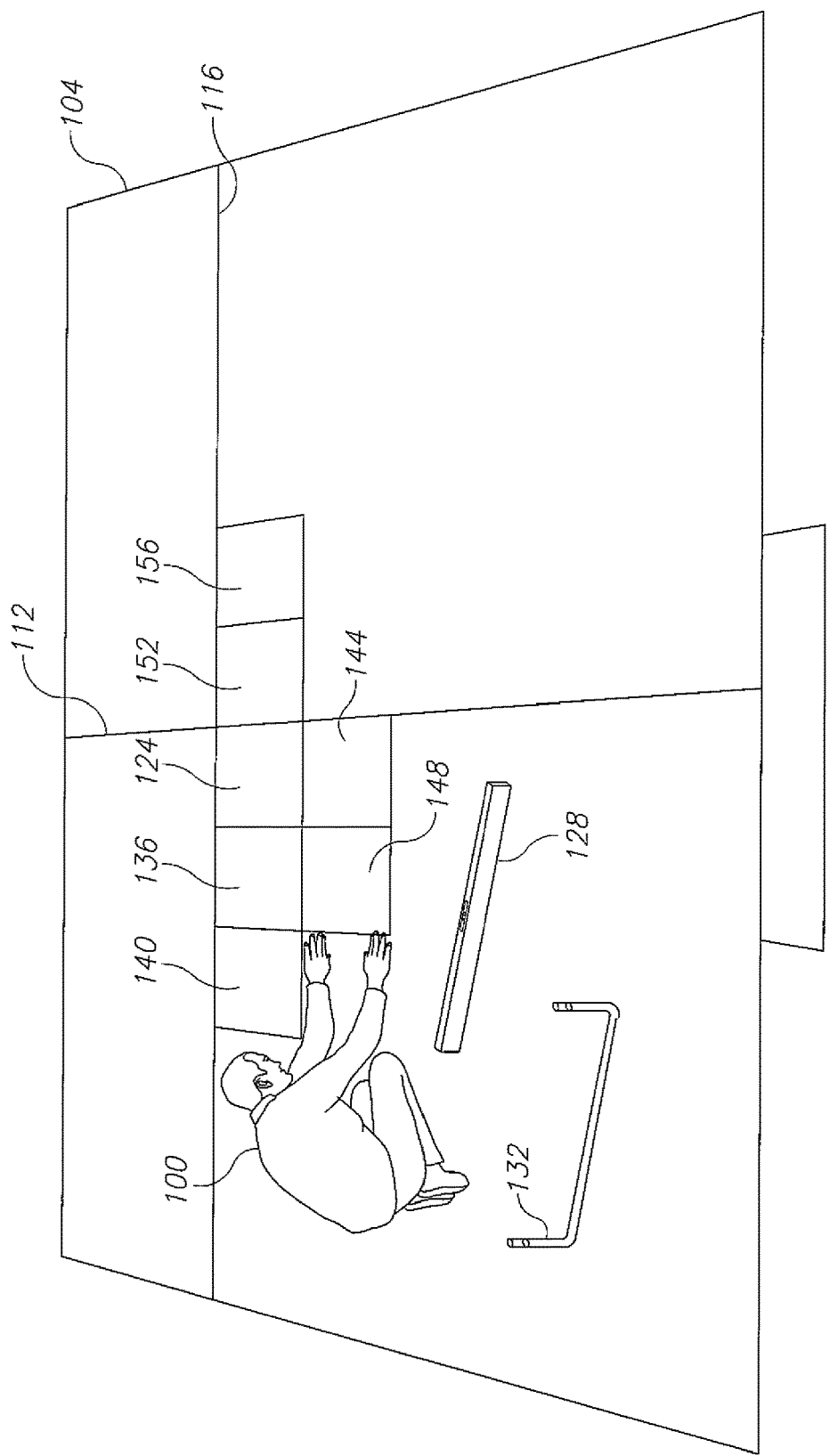
FIG. 1 is a schematic illustration of a traditional working process when tiling an area.

FIG. 1 shows a traditional typical tiling workflow when tiling a planar area such as a room floor. A tiler 100 is tiling a room 104 having an opening 102. The tiler indicates two non-parallel lines, such as vertical line 112 and horizontal line 116 using a ruler, a thread, a laser indicator or any other device. Each of lines 112 and 116 generally traverses the room between two opposite walls, forming together a coordinate system and are used as leading lines for the tiling operation.

The tiler starts by laying a first tile 124 in an intersection of vertical line 112 and horizontal line 116, and determines whether the tile is leveled, using a device such as a bubble level 128, or any other means for setting the height of first tile 124. The height in which the tile is set is identified and marked by reference to an absolute point (e.g., the floor in a next room), a level marked by a different measurement technique relative to another known reference for example by using a water level 132, arbitrarily, or in any other manner.

The tiler then works along horizontal line 116, setting tile 136 adjacent to tile 124, then tile 140 adjacent to tile 136, and so on until reaching a wall.

The tiler may then work his way along a second horizontal line, setting tile 144 adjacent to tile 124, then tile 148 adjacent to tile 144, and so on until reaching a wall.

The tiler may then work along further lines parallel to horizontal line 116, starting each line at vertical line 112. The tiler may then proceed with tiling in a similar manner the area to the right of vertical line 112, starting with tile 152, working his way rightward by setting tile 156 and further tiles, and then continuing with further lines.

The tiler works his way backwards such that he or she does not kneel or step on a newly placed tile, which may cause the tile to shift from its position, since the substrate is still responsive to pressure as it had not solidified yet.

It will be appreciated that tiling may or may not start at the side of the room further from the opening. It may also be appreciated that tiling may be performed at any other order.

Analogous or alternative tiling schemes may be used for tiling with non-rectangular tiles, tiling layouts in which the tiles are not parallel to the walls; tiling non-rectangular areas, or the like.

When laying each tile, the tiler pads the area with filling material, places the tile and aligns the tile edge, directly or with a spacer, to an edge of an already laid adjacent tile. The tiler then knocks on different points on the surface of the tile to lower it, until the tile reaches the required surface which is typically the same height as the previously-laid tile. The tile is eventually supposed to be aligned with and at the same height as a previously-laid tile, and leveled, i.e., has uniform height all over. Determining that the tile is leveled may be done using any level such as a bubble level, and determining that it is at the same plane as previously laid one or more tiles may be done using a ruler that may stretch along two or more tiles. Some tools may be used, which combine the functionality of a bubble level and a ruler.

Significant care is typically taken to make sure that there is no height offset, also referred to as step, between two tiles, by carefully aligning their edges. This is especially critical when the tiles are not being polished after the layout.

In this method, since every tile is leveled relatively to an adjacent tile, even very small error, for example +/−0.5 mm in placing a tile, may accumulate to a significant error over a stretch of a room. Additionally, the method suffers from inherent deficiencies when working with certain tile types, such as tiles having a non-uniform or non-planar surface, resilient tiles or others.

Some embodiments of the disclosure relate to an apparatus for dynamically measuring the absolute location of a tile in one or more dimensions, such as its height. Thus, each tile is laid at the required height regardless of its neighboring tiles, such that errors are not accumulated, and the overall error is similar to the error of laying a single tile.

Figure 2A:
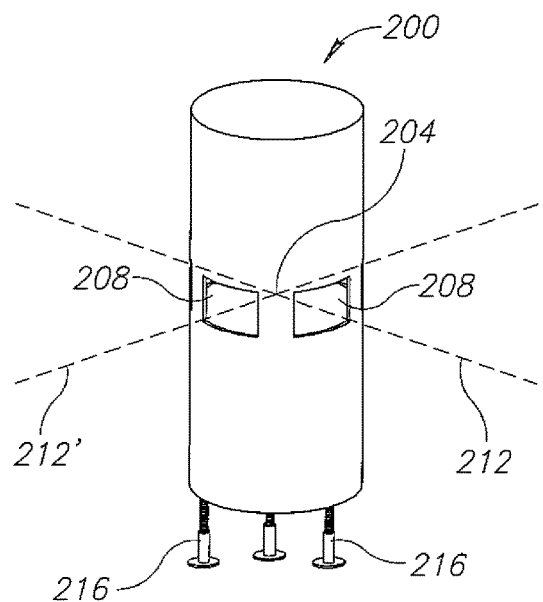
FIG. 2A is a schematic drawing of beam emitting device, in accordance with some embodiments of the disclosure.
Figure 2B:
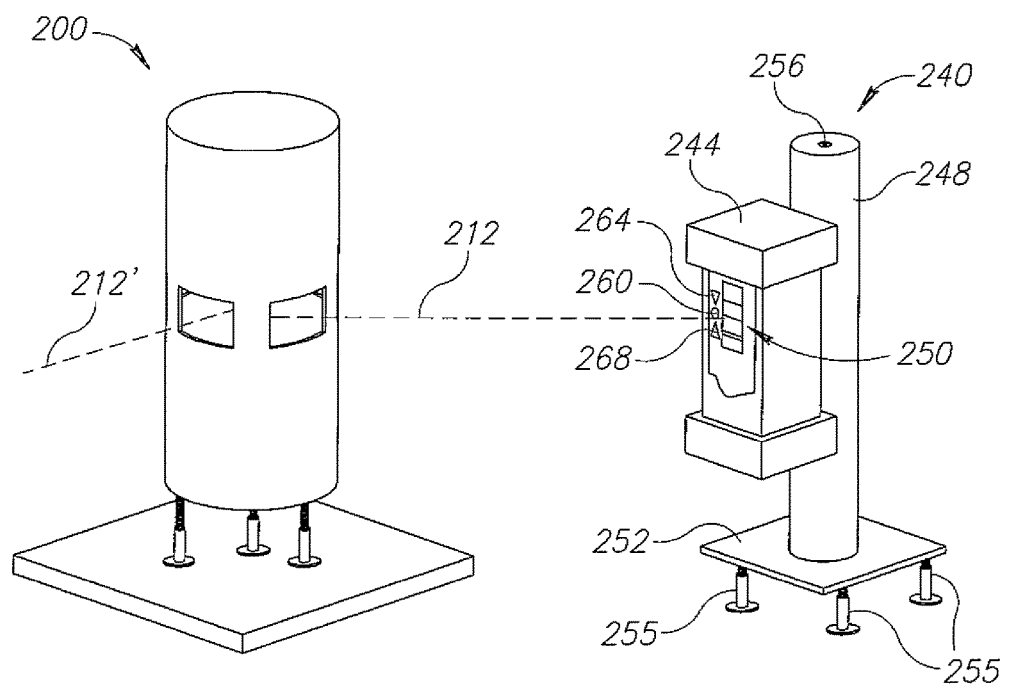
FIG. 2B is a schematic drawing of beam emitting device and a beam reading device, in accordance with some embodiments of the disclosure.

Referring now to FIGS. 2A and 2B, showing schematic drawing of aspects of an apparatus for leveling tiles. In some embodiments and as shown in FIG. 2B, the apparatus comprises a reading unit 240, adapted to read a beam emitted by a beam-emitting unit 200, also referred to as emitter.

Referring now to FIG. 2A, showing a schematic drawing of beam emitting device 200, also referred to as emitter. Emitter 200 is a unit comprising a light source 204 emitting a narrow beam 212, such as a laser beam, through one or more transparent openings 208. Beam 212 is emitted from the light source in a wide angle, e.g., in an angle of at least 100° or at least 140°, and preferably 360° or close to 360°. The beam is emitted in a horizontal direction, i.e. at an absolute constant height at all directions, thus defining a plane, regardless of the surface on which emitter 200 is placed. Since emitter 200 may be placed on a non-horizontal surface, the required emitting direction is not necessarily perpendicular to the longitudinal axis of the emitter. Therefore, emitter 200 may determine the required emitting direction using gravity measurements. For example, if the gravity direction is perpendicular to a cross section of reader 200, beam 212 will be emitted in parallel to the cross section, while if the gravity direction is at a first angle other than 90° to a cross section of emitter 200, beam 212 will be emitted in an angle completing the first angle to 90° relatively to the cross section.

Emitter 200 may comprise three or more kickstands 216 for stabilizing and adjusting the height of light source 204, which is the height at which the beam will be emitted. Alternatively, emitter 200 may be mounted on a stand, a pole, or the like. If the tile surface is not planar, for example has a pattern, adjusting kickstands 216 may be used for making sure the beam is emitted at a predetermined height above the tile or relatively to a feature thereon. Emitter 200 may be commercially available, for example a cross laser from geo-FENNEL of Baunatal, Germany or from Bosch of Stuttgart, Germany.

Referring now to FIG. 2B, showing emitter 200 and reading unit 240. Reading unit 240 comprises a beam reader 244, also referred to as reader, mounted on a shaft or column 248, which is positioned on base 252 which may be stably placed on a surface such as a tile. As detailed below, beam reader 244 is adapted to receive a beam in a range of heights, and provide an indication to the height at which a beam is received. Since beam reader 244 may also be placed in 90° to the shown position, the beam may generally be received at location within a range of locations.

In some embodiments, reader 244 may be moved along the main axis of shaft 248, for example up or down along shaft 248 when base 252 is horizontal. The position of reader 244 above the surface, which is comprised of its height above base 252 plus the height of base 252 above tiling surface, is referred to as the height of the reader. The height of reader 244 may be measured by mechanical elements such as a measuring scale. Alternatively, if shaft 248 includes a screw and reader 244 is screwed along shaft 248 to reach the desired height, the height may be determined by determining the number of turns or parts thereof between the reader's location and the base, and calculating the height using the thread pitch dimensions of shaft 248. The turn count may be determined using mechanical or electronic means. In some embodiments, reader 244 may be rotated relative to base 252 such that sensor 250 faces beam emitter 200, without changing the height of reader 244 or moving base 252.

In some embodiments, the emitter may use optical prisms or other mechanisms for spreading the beam into a horizontal plane.

Reader 244 may comprise an optical beam detector device 250, typically comprising an array of detectors and an electronic circuit covered by an infra-red filter.

Sensor 250 detects the location on reader 244 in which the beam is intercepted. The size of sensor 250 determines the range of heights at which the beam may be received. The size may vary, for example between 1 cm and 15 cm. In some embodiments, multiple sensors 250 may be used and placed at different heights on reader 244, to provide a larger height range.

Shaft 248 may have a level assessment component such as bubble level 256 on its top to detect the tilt of the shaft. Bubble level 256 may be a single round bubble level, also referred to as a bull's eye level, or may comprise two or more tubular spirit levels, a pendulum, a Micro-electromechanical systems (MEMS) device with a 3D accelerometer that detects the directions toward earth, or any other device for assessing the tilt of the shaft.

Base 252 may comprise three or more kickstands 255 for adjusting the height and level of reading unit 240 relatively to the object such as the tile it is placed on, while maintaining reader 244 steady on a surface.

In some embodiments, base 252 may be omitted, in which case kickstands 255 may connect directly to shaft 248.

Beam reader 244 may have one or more indicators arranged along its vertical edge, for indicating the height at which a beam, such as beam 212 emitted by emitter 200, is received.

In some embodiments, each of the indicators may comprise one or more lights of particular colors, for providing feedback to a user. For example, a central indicator 260 located substantially at the middle of the vertical range of reader 244 may have a green light and may have a symmetric shape, while other indicators such as indicators 264 and 268 may have a red light and an asymmetric shape, for example an arrow pointing in the direction at which the beam is received above or below. Additionally or alternatively, reader 244 may also be equipped with an audio feedback component for generating an acceptance sound that indicates that the beam is received at the required height aligned with the central indicator, or a rejection sound indicating that the beam is too low or too high and by what level from the required target. The rejection sound may provide an auditory indication whether the beam is received too low or too high optionally with an indication of the deviation magnitude, for example by using corresponding pitch, volume, sound pattern, or the like. For example an acceptance sound may be a continuous tone, above target sound may be high frequency intermittent sound (for example 5 beeps per second) while below target sound may be a low frequency intermittent tone (for example two beeps per second). In other embodiments, an acceptance sound may be a tone at an intermediate frequency, above target sound may be a high frequency tone with a pitch proportional to the magnitude of the deviation from the target, while below target sound may be a low frequency tone with a pitch proportional to the magnitude of deviation from the target. In some embodiments, the audio volume may be indicative of the deviation magnitude. An audio indication enables a tiler to receive an indication whether the tile is too high or too low without having to look at reader 244. It will be appreciated that the indication is not limited to visual or audio feedback, and additional or alternative one or more means may be used. It will also be appreciated that the feedback relates to the required location and level of the tile which may differ from those of reader 244. The required location of the tile may take into account the gradient of the tile or of reading unit 240 and the height of reading unit 240 above the tile.

In some embodiments, the device may be adapted to generate an acceptance sound or provide an acceptance visual feedback if the beam is received at the height of central indicator 260, and provide rejection feedback otherwise. In other embodiments, the user may decide the correct height, for example the height associated with indicator 264. The user may then indicate this to the device, using for example a touch screen, a keyboard or the like. In this case the device will provide an acceptance feedback if the beam is received at the determined height, and a rejection feedback otherwise, wherein the rejection feedback may change depending on whether the beam is received higher or lower than indicator 264. It will be appreciated that setting the correct height, which is part of the calibration process, may be repeated as often as required.

It will be appreciated that the indication may be provided continuously throughout the operation, such that the user is provided with continuous feedback and may continue adapting the location or tilt angle until the feedback received is of reaching the required target position.

Figure 3A:
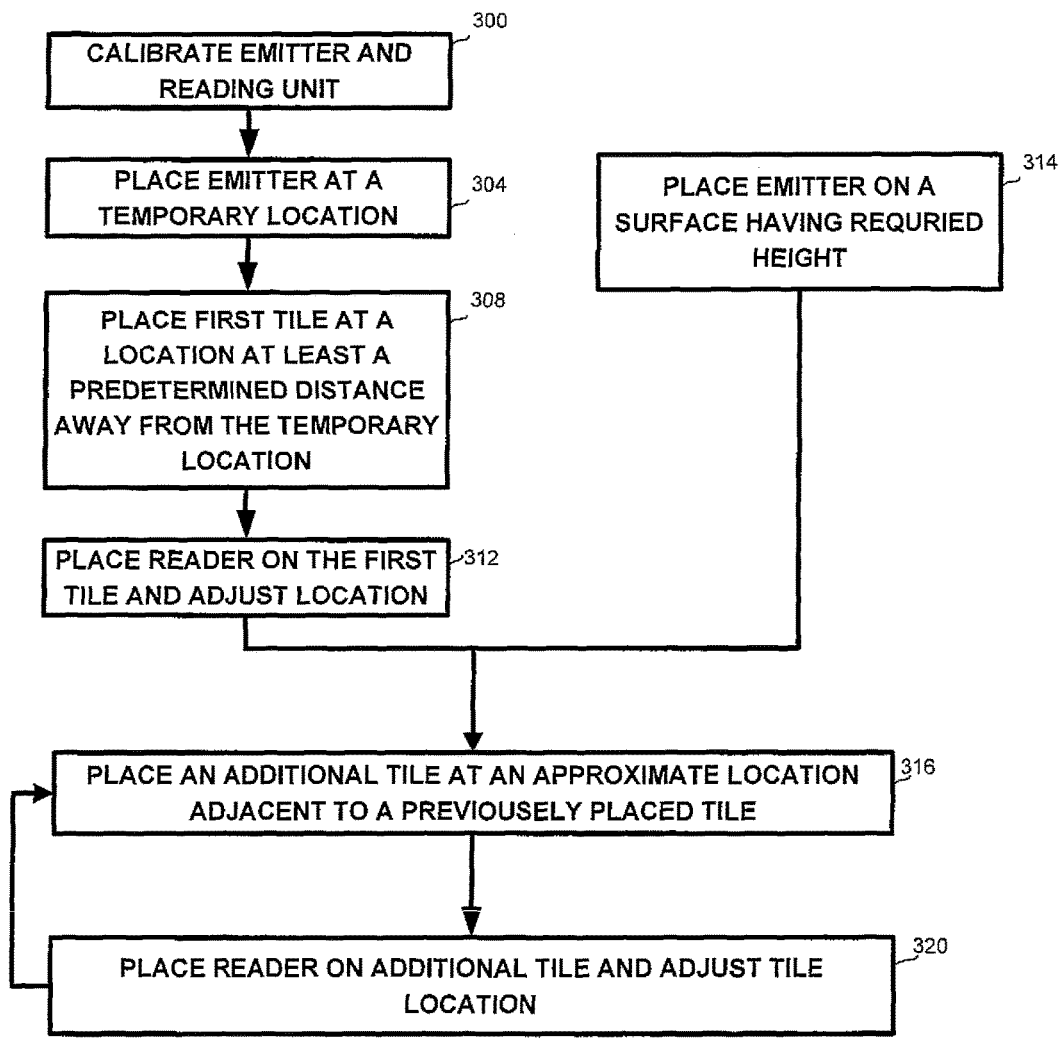
FIG. 3A is a schematic drawing of an area to be tiled for demonstrating the work flow, in accordance with some embodiments of the disclosure.

Referring now to FIG. 3A, showing a flowchart of a method for placing tiles when tiling a planar horizontal area.

On step 300, the tiler may start with a calibration phase, in which the tiler may place emitter 200 and reading unit 240 on a leveled plan, at a distance, such as 1.5 m, since in some embodiments a minimal distance is required between emitter 200 and reading unit 240 to ensure exact reading.

The tiler may then calibrate the positions of emitter 200 and reading unit 240 such that the beam emitted from emitter 200 hits reader 244 at exactly the height of central indicator 260. When the height is adjusted, reader 244 may display a horizontal line at the height of central indicator 260, turn the green light on or generate an acceptance sound. The tiler may also make sure that reader 244 is leveled, using for example, level 256. Calibration may comprise setting kickstands 216 of emitter 200, setting kickstands 255 of reader 240, moving reading unit 244 along shaft 248 and possibly other actions. The adjustments of kickstands 255 and the position of reader 244 along or around shaft 248 may be fixed for example by a screw-nut, or any other locking mechanism. At the end of the calibration phase, the height of the beam above the surface of the leveled plan is referred to as the beam height.

Figure 3B:
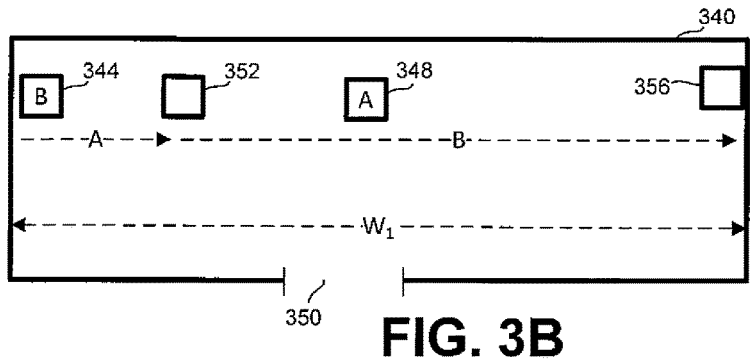
FIGS. 3B, 3C and 3D are schematic drawings of areas to be tiled for demonstrating the work flow, in accordance with some embodiments of the disclosure.
Figure 3C:
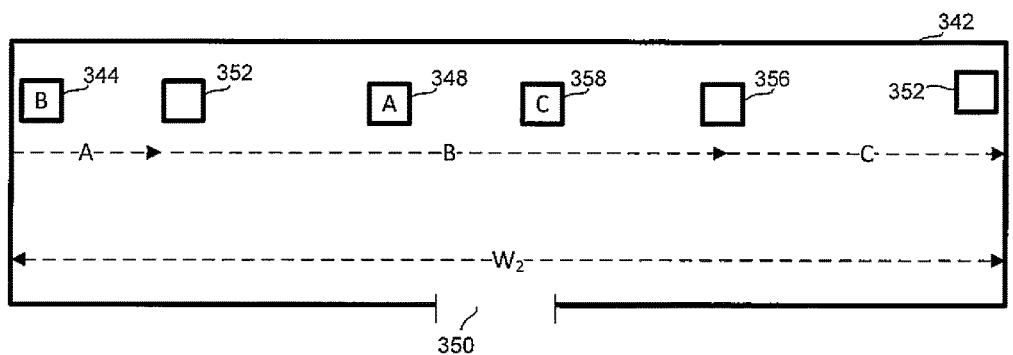

The following steps refer to the process of placing one or more tiles, regardless of the room shape. FIGS. 3B and 3C below describe the work flow of tiling a space.

On step 304, once calibration is completed, a tiler may place emitter 200 at a temporary location, such as a temporary tile, wherein emitter 200 is at the beam height above the desired height of the tiles.

On step 308 the tiler may position a first tile at an approximate required location within the tiled area, and at a distance which is at least the required minimal distance from emitter 200.

On step 312 the tiler may then place reader 240 on the first tile, wherein emitter 200 and reader 240 are as calibrated. The first tile may then be adjusted as required by knocking or pressing on points on the tile, or taking other operations in order to place the tile at its required position. In the required position the tile is at the required coordinates and orientation, level 256 indicates that the tile is leveled, and the beam from beam emitter 200 is received at the height of central indicator 260. Once the beam emitter 200 is received at the height of central indicator 260, an acceptance indication is provided, by turning on the green light, making an acceptance sound, or the like. Once the conditions hold, the tile is at the required height, and is horizontally leveled.

In cases such as when only a part of an area is to be tiled and another part is leveled and has the required height, step 314 may be performed alternatively to steps 300, 304, 308 and 312. On step 314, the tiler may place emitter 200 on a surface having the required height such as a previously laid tile or a paved area.

The process may continue for further tiles as long as the distance between the placed tile and the emitter is above the predetermined distance.

On step 316 each such additional tile is placed adjacently to a previously laid tile, and on step 320 the reader is placed on the additional tile and the additional tile is adjusted such that it is horizontally leveled, and at the same height as the previously laid tile. Thus, each tile is leveled and placed at the desired height independently of other tiles, such that any measurement error, if exists, is relative to the reference beam and not relative to adjacent tiles, thus avoiding error accumulation.

During the process of placing additional tiles, care is taken to align the edges of any two adjacent tiles, such that the tiles are at exactly the same height and a "step" is avoided. This may be done by manually feeling the presence of a 'step' and adjusting the tilt of the current tile to minimize eliminate the step. Occasionally, small deviation from the absolute height or level may be used to avoid the 'step' effect.

Since the measurement is done using the same reference and using same measuring device, the small local deviations required to avoid steps do not accumulate.

When tiling large areas, a problem that may occur relates to inherent inaccuracies of emitter 240 which depend on the distance, i.e., the larger the distance of a point from emitter 240, the larger is the error in the height of the received beam. On the other hand, if the distance between emitter 200 and reading unit 240 is too small, for example below a threshold such as about 1 m, the reading may not be accurate either.

Figure 3D:
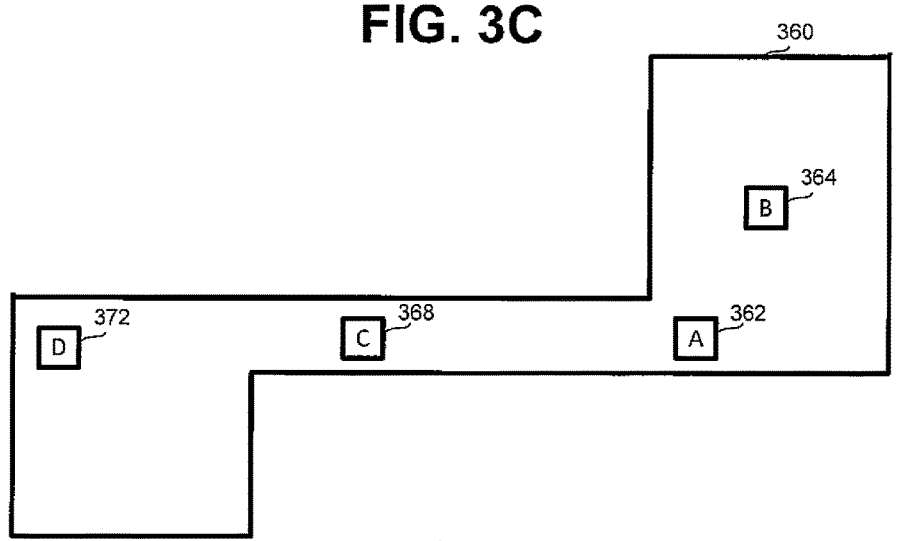

In order to overcome these limitations, the work flows described below and demonstrated in FIGS. 3B, 3C and 3D may be applied. In FIGS. 3B, 3C and 3D a location and an area marked with the same letter indicate that when the emitter is at the location carrying the letter, tiles are placed in parallel to the arrow carrying the same letter.

Emitter 200 and reading unit 240 may be adjusted as described in association with step 300 of FIG. 3A above, such that the emitted beam is received at exactly the required height. The adjustment may be done at a location other than the area to be tiled, when the units are placed on tiles known to be leveled and aligned or on another plane (for example by using a water level), or in any other manner.

Referring now to FIG. 3B, demonstrating a situation I which a dimension of an area 340 to be tiled, for example width $w_1$, is such that the device error accumulated along its full stretch is acceptable, then the tiler may place the emitter at a temporary location A, indicated for example as location 348 within room 340, and may start laying tiles at an end of the area, for example at location 344. It will be appreciated that the tiles starting at location 344 may be laid as described in association with FIG. 3A above. The tiler may continue in parallel to arrow A towards location 348 as long as the distance between the placed tile and location 348 exceeds the predetermined minimal distance, for example until location 352. The tiler may then move emitter 200 to location B (344) and work his way backwards or sideway from location 352 towards location 356 in parallel to arrow B, moving reading unit 240 to each tile being laid. This way the tiler makes sure that at all times: (1) the tiler can work backwards or sideways and does not kneel or otherwise step on previously laid tiles when laying a new tile; (2) the tiler does not block the line of sight and hence the beam between emitter 200 and reading unit 240; and (3) the distance between emitter 200 and reading unit 240 is in the range in which the error is acceptable.

The tiler may continue in the same manner for the next row and for further rows until the tiler may reach opening 350, such that the tiler will not step on freshly laid tiles when leaving the room. Alternatively, instead of tiling one row at a time, the tiler may lay two or more tiles of different rows at a time.

Referring now to FIG. 3C, showing a situation in which a dimension of an area 342 to be tiled, for example width w2, is such that the device error accumulated along its full stretch is unacceptable, as typically the error is proportional to the distance between the emitter and the receiver.

In this case the, the tiler can start as in FIG. 3B by placing emitter 200 at a temporary location A, indicated for example as location 348 and may start laying tiles at location 344 in parallel to arrow A as described in association with FIG. 3A above. The tiler may continue towards location 348 as long as the distance between the placed tile and location 348 exceeds the predetermined minimal distance, for example until location 352. The tiler may then move emitter 200 to location B (344) and work his way in parallel to arrow B backwards towards location 356, moving reading unit 240 to each tile being laid. When the tiler gets to an area in which emitter 200 and reading unit 244 are too far so that the error is unacceptable, the tiler may move emitter 200 to location C (358) and work his way from location 356 to location 352 in parallel to arrow C. When moving the beam to location C (358), emitter 240 may be placed such that the beam height is adjusted using measurements taken by a tool that is not subject to errors proportional to the distance (such as a water level), or tools in which the error is significantly lower, such as optical level measurement tools. The adjustment may be done for example by changing the height of the emitter such that the beam is emitted at the expected height instead of the height previously calibrated, to compensate for any error in tile 358 height.

It will be appreciated that further relocations of emitter 200 may be required for tiling wider areas.

The tiler may then repeat the process for further rows, thus getting closer to opening 350. Alternately, rows closer to entry 350 may be tiled before moving the position of the emitter.

Referring now to FIG. 3D, showing an area 360 to be tiled, in which there is no line of sight between all parts of the area. According to the same principles detailed above, and depending on the area dimensions relatively to the operative distances between emitter 200 and reading unit 240, placing emitter 200 at location A (362) and tiling the areas in which the error is acceptable, and then relocating emitter 200 to locations B (364), C (368) and D (372) may be sufficient for tiling the whole area.

It will be appreciated that in addition to usage when tiling an area, the apparatus may also be used for quality assurance of a completed task. In such circumstances, a person in charge of evaluating the tiling quality may adjust reading unit 240 when placed at the required distance from emitter 200, and may verify that when moving reading unit 240 to further tiles without changing the adjustment, each such tile is leveled, and the beam is received at the height of central indicator 260, thus ensuring it is located in the same height as the first tile.

In some embodiments, level 256 of reader 244 may be a non-mechanic level but rather an electronic level, which measures the size and direction of the deviation of reader 244 from the absolute vertical position, for example using a 3-dimensional accelerometer which senses the direction of earth gravitation. Such level may be, for example, H3LIS331DL MEMS motion sensor: low-power high-g 3-axis digital accelerometer available from STMicroelectronics of Geneva, Switzerland. In some embodiments, reading unit 240 may comprise a processing unit such as any dedicated, general purpose, programmable or any other processor, and a display component. The processing unit may receive the reading from level 256, and the display may provide a graphic indication of the level of reading unit 240 and hence the level and height of the tile it is placed on. In some embodiments, the display component may show positioning information showing to a tiler how to tilt and/or descend the tile, in order to place the tile at the target position.

Referring now to FIGS. 4A and 4B showing one display option in two situations. FIG. 4A shows a display 400 indicating that the reader is not leveled and is tilted along line 404, while FIG. 4B shows an indication that reading unit 240 is leveled. Optionally areas 402 and 406 of the display in FIG. 4A may be colored or patterned such that it is clear which side is to be raised and which is to be lowered. For example, area 406 that indicates the high area may be colored in a darker shade or a denser pattern than area 402 that indicates the area to be lowered.

FIGS. 4C and 4D show an indication for the level as an inner circle 412 within outer circle 416. When inner circle 412 is concentric with outer circle 416, the device is leveled. In some embodiments, inner circle 412 may have a different shade or color than outer circle 416. In some embodiments, the color or shade of inner circle 412 may change as inner circle 412 gets closer to the center, as the device is better leveled. In some embodiments, if the device is perfectly leveled, inner circle 412 may be at the same shade as outer circle 416, or may have a different color indicating it is aligned. In addition or instead of the graphical indication, numerical indication may provide the tilt from level position.

When the tile is not leveled, the height measurement done with respect to the beam is inaccurate due to the non-perpendicularity of the sensor measuring axis with respect to the plan defined by the beam, as detailed in association with FIG. 2A above, wherein larger tilt values cause larger deviations in the height determination. It will be appreciated, that this deviation from the correct height may be corrected by applying standard trigonometric transformations that incorporate also the tile tilt information for determining the true height of the point on which the sensor is placed. Additional trigonometric calculations may provide the height of any other point of the tile.

As part of the tiling process, the tilt of the tile being positioned changes, thus these calculations are required for displaying to the tiler the accurate height throughout the tiling process.

Referring now to FIG. 4E, showing a top view of a further display 424 of reading unit 240 placed on tile 420. As detailed in association with FIG. 5A below, reading unit 240 may be equipped with arms 422 stretchable to the edges or corners of the tile. Reading unit 420 may be further equipped with an input device such as a keyboard, a touch screen or other input device, through which a user can enter the dimensions of tile 420, or a communication channel to other electronic devices that may provide the required information.

Reading unit 240 may be placed in the vicinity of the meeting points of the tile diagonals, and the user may further change the yaw of reading unit 240 such that an indicator for example a physical arrow 428 or a touch device points to a predetermined part of the tile, for example the middle of the short edge of the tile.

Display 424 may then show a rectangle 432 having the same proportions as tile 420, and an indicator 436 pointing at the direction at which the tile gradient is largest, such that the tile should be tilted in a parallel direction to arrow 436. In some embodiments, the arrow size may indicate the tilt, for example showing a larger arrow as the tile is more tilted. The tiler may then adjust the tile as required.

The combined information of the tile size with the level, the tile height as determined according to the position at which the beam is intercepted by the sensor and the reader position on the tile (i.e., the measuring point), may be combined using standard mathematical calculations to calculate the level, gradient, and tile height at any given part of the tile, for example at the tile corners or edges.

It will be appreciated that display 424 may further comprise a numerical display showing the tilt degree, the height above the target height at one or more points of the tile (such as at the highest, the lowest, any of the tile corners, or the like), or any other numerical values. It will also be appreciated that the displays disclosed in FIGS. 4A-4E are exemplary only and the disclosure also covers other displays indicting the tilt and/or offset from the target height of the tile.

Additionally or alternatively, device 240 may provide an audio or another indication to whether reading unit 240 is leveled, or of the minimal or maximal deviation from the target position such that the user will not have to look away from the tile to realize the deviation of the tile from its final destination.

In some embodiments the processing unit may receive from level 256 the deviation as detailed above, and also the height at which the beam from reader 244 is received. The processing unit may then determine, and a display may show the deviation of the tile or an area thereof from the target position, expressed in height units, degrees, or the like, as shown for example in indication 419 of FIG. 4C or indication 430 of FIG. 4E. It will be appreciated that the display may operate continuously, thus providing feedback to the tiler as of the current position of the tile relatively to the target position.

In some embodiments, for example when tiling with very large tiles, such as tiles larger than 50 cm in any dimension which may sink or rise in the central areas in one of its corners, or when tiling with tiles having non-uniform surface, such as slate tiles or some types of granite porcelain tiles, checking the leveling at one area of the tile may not be sufficient, since it may not represent the tile's overall level, and the height or the angle (slope) at the specific area may not provide a measure representing correctly the tile position.

Figure 5A:
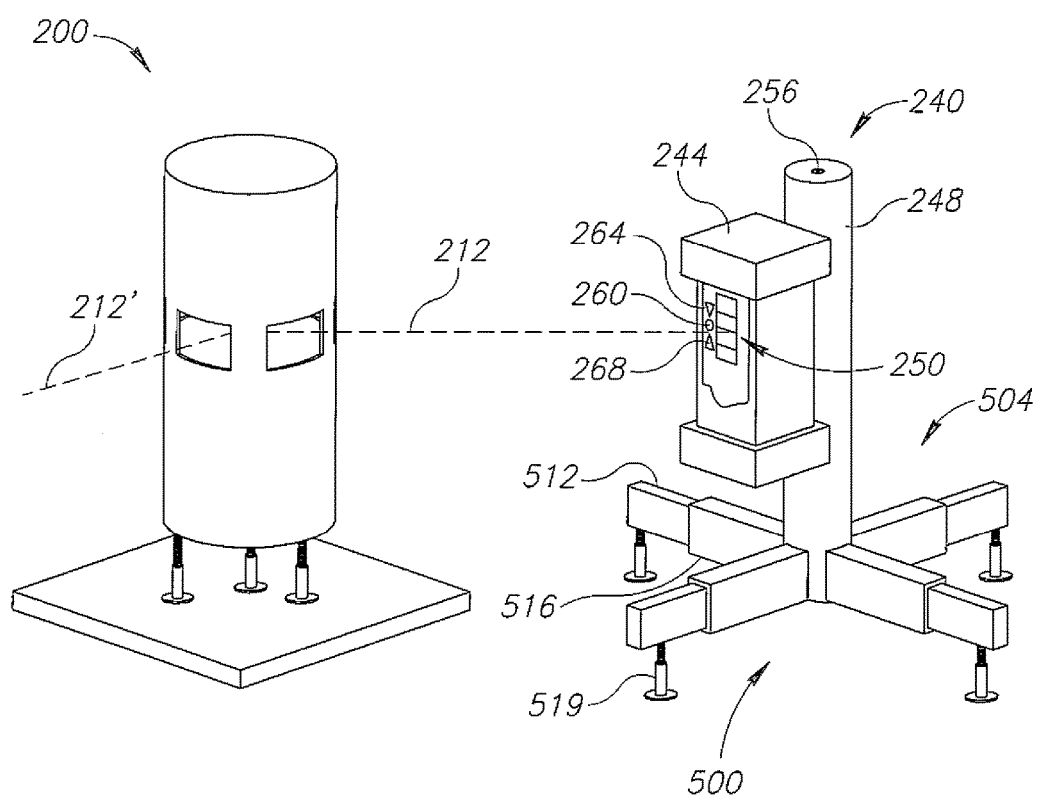
FIG. 5A is a schematic drawing of a measuring unit with extendable arms, in accordance with some embodiments of the disclosure.

In order to overcome this problem, reading unit 240 may be equipped with extendable arms 500 shown in FIG. 5A, instead of or in addition to base 252. Reading unit 240 may thus have at least two arms extendable in two or more directions, to stably locate reading unit 240 on the tile, and such that the leveling and height of reading unit 240 is measured over a larger portion of the area, such as over a large tile, and by that reducing the effects of local deviation of surface height or angle. In one embodiment, the arms are structured to allow touching the tile at or close to its corners while the measuring device is located in the vicinity of the tile center. Such placement provides an enhanced approximation to measuring the plane generated by the edges of the tile. In some embodiments, and as shown in FIG. 5A, each such arm may comprise two parts wherein a first member 512 can move into or out of a second member 516 to change the arm's stretch. Optionally, the relative position of members 512 and 516 may be fixed by a screw, a lock or any other mechanism after being set for a particular tile size.

In some embodiments, reading unit 240 may comprise four arms, which may or may not be positioned at 90° to each other. In some embodiments, parts 516 of two opposite arms may be made of a one unit. By positioning reading unit 240 on a tile with arms 500 stretched, the measurements cover a larger part of the tile rather than just the area on which reading unit 240 is placed.

In some embodiments, the distal end of each arm, such as the distal end of part 412, may be equipped with a kickstand 519 or another attaching member for placing or attaching arms 400 to an edge of a tile on which reading unit 240 is positioned.

Figure 5B:
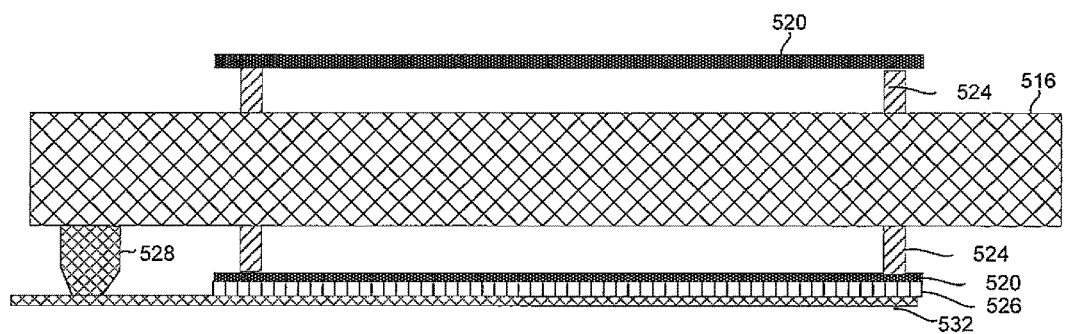
FIGS. 5B and 5C are a side view and a cross section, respectively of an arm with a sleeve, in accordance with some embodiments of the disclosure.
Figure 5C:
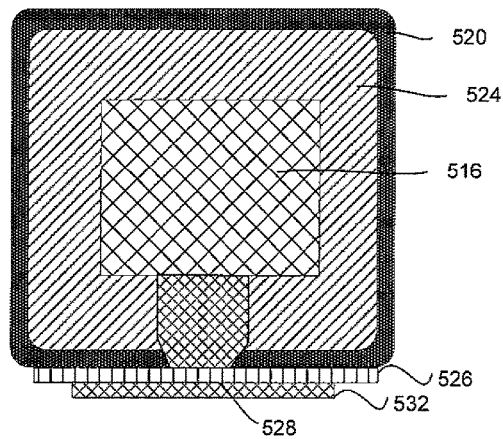

In some situations, arms 400 may be getting in the way of knocking on the tile as part of the placement process. Referring now to FIGS. 5B and 5C showing a side view and a cross section of one such arm, respectively, further equipped with a kickstand and a sleeve. At least a part of each arm, the part comprising some of member 512, some of member 516 or some of both members may be wrapped with a rigid substantially rectangular sleeve 520 made for example of aluminum or another rigid material. Sleeve 520 may be connected to but distanced from member 512 or 516 by one or more substantially rectangular rings 524 made of flexible material such as foam or rubber, or having flexible shape, such as springs. In addition, the bottom of sleeve 520 may be covered by a layer 526 made of a soft material such as rubber or silicon, to prevent scratching or other damaging effects to the tile, that may be caused by a hard metal object. When knocking on the upper part of sleeve 520, the force is transferred to the tile through the lower part of sleeve 520 and the soft layer 526 which is in contact with tile 532. In order to suppress vibrations and avoid damage to members 512 or 516, rings 524 may isolate members 512 or 516 from sleeve 520. In order to stabilize arm 400 on the tile, member 512 may be equipped with a kickstand 528 having substantially height equal to the width of rings 524 plus the width of sleeve 520. Thus, when reading unit 240 with arms 500 is placed on the tile, the lower part of sleeve 520 and kickstand 528 are in contact with the tile, and are free to move in response to the knocking operations, due to the flexibility of rings 524. In some embodiments sleeve 520 may be comprised of multiple sections, in order to cover a larger portion of the arm 516 at different length positions, and to better localize the impact of the knocking operations to a specific part of the tile. Sections of sleeve 520 may be added or removed by disassembling member 512 from the measuring device, by temporarily disassembling kickstand 528, or otherwise enabling the sliding of sleeve 520 to place. Since rings 524 are flexible and non-rigid, and do not tightly attach sleeve 520 to arm 516, sleeve 520 may be shifted along member 512 or member 516 to a desired location to allow effective knocking as part of the tile positioning.

In some embodiments, either or both emitter 200 and reading unit 240 may comprise a communication means or a user interface module, and components for receiving data required for tiling. For example, any part of the system may comprise a communication module for receiving a list of locations in the plane to be tiled, each location identified as a set of X, Y and Z coordinates and a spatial angle which may be expressed as a reference line and an angle, as two angles referring to two edges of the tile, or as any other combination of two data items. The locations may be received from a computing platform via a communication channel, from a user using an input device such as a keyboard, a touch screen, a mouse, or the like. Additionally or alternatively, the system may receive a plane design provided in any design format from which it may retrieve for each pair of X and Y coordinates the corresponding height and spatial angle. The coordinates may be provided in an absolute manner, relatively to a known location, such as a corner of the room, the emitter location, or the like.

Figure 5D:
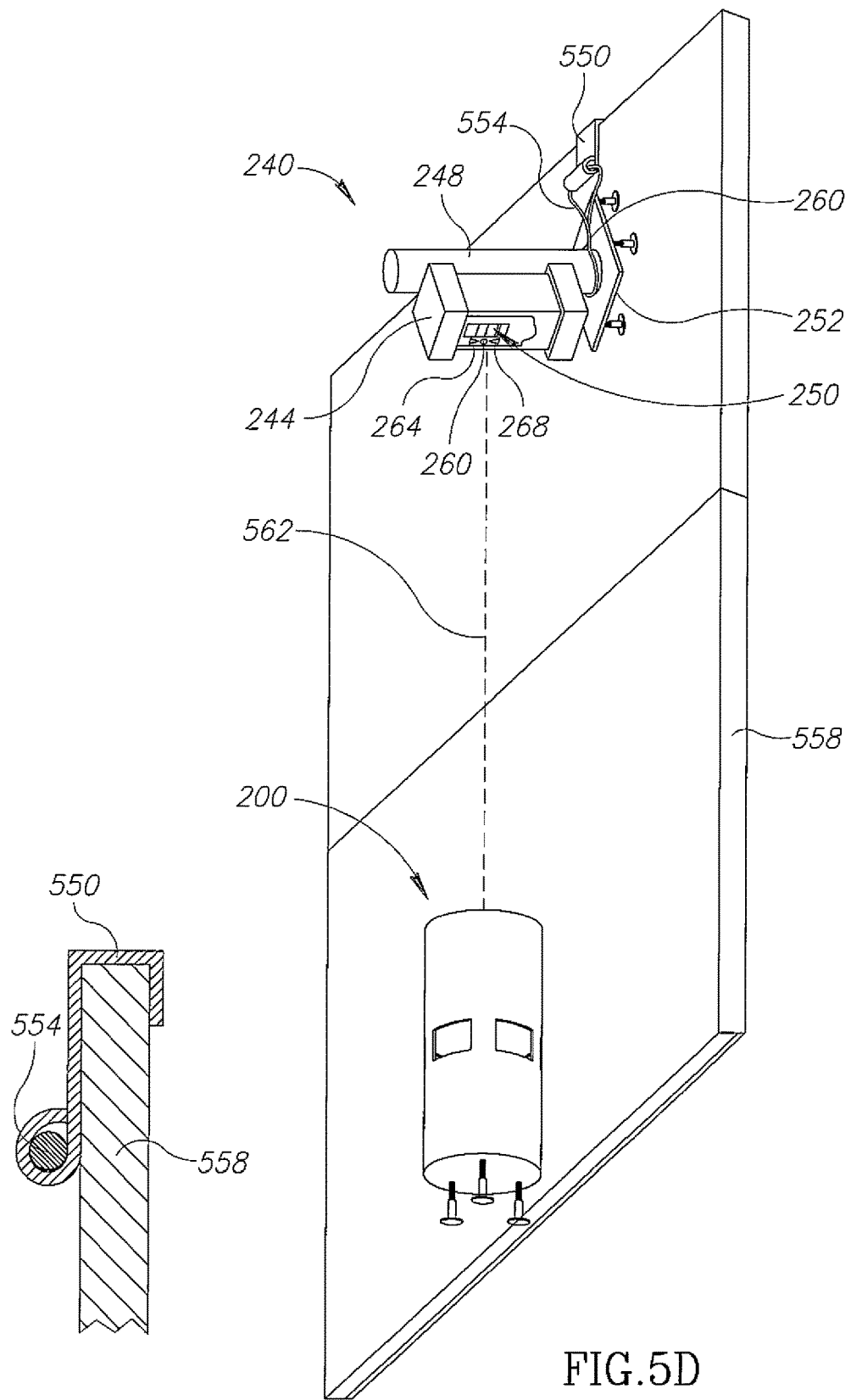
FIG. 5D is a schematic drawing of a measuring unit used for tiling vertical surfaces, in accordance with some embodiments of the disclosure.

Referring now to FIG. 5D, showing a reading unit 240 used for tiling non horizontal planes, for example vertical surfaces. This configuration uses an emitter 200 adapted to emit a beam in a non-horizontal direction, for example vertical direction. Additionally or alternatively, the emitter may be mounted to the wall by using a stand mounted to the wall and connected to the emitter, optionally at a socket at the bottom of the emitter, to allow removal and re-positioning of the emitter to the correct position.

The apparatus may comprise a hook 550 holding a thread or string 554 which may be rigid or semi rigid, and which is connected to reading unit 240 close to its base, or bound around shaft 248, such that the tiler does not need to hold reading unit 240, and reading unit 240 is perpendicular to substantially vertical tile 558 being tiled during the tiling process. Emitter 200 may be adapted to emit a beam 562 in a direction parallel to its main axis, such that the beam hits reading unit 240 hanged on the tile, or may be placed sidewise such that its beam is projected parallel to the vertical surface. The tiling process may then continue analogously to tiling a floor tile as described above. Other means to attach the device to a vertical wall may include more rigid clips that may keep the device attached to a vertical tile.

It will be appreciated that the apparatus and method may also be used for tiling planar non-flat planes. In such cases, an emitter may be used which may emit a beam parallel to the plane being tiled, i.e., at a specific angle relatively to a horizontal plane. The target position of reading unit 240 is perpendicular to the plane being tiled, and thus the accepted level is at an angle complementing the specific angle to 90°. In addition, it is required to maintain reading unit 240 at a predetermined yaw position relatively to the tile. The combination of the level angle and the yaw position, together with height at which the bema is intercepted by the sensor, provides the current position of the tile. When the current position and the target position are the same, or the difference is small enough, the tile properly located.

Figure 6A:
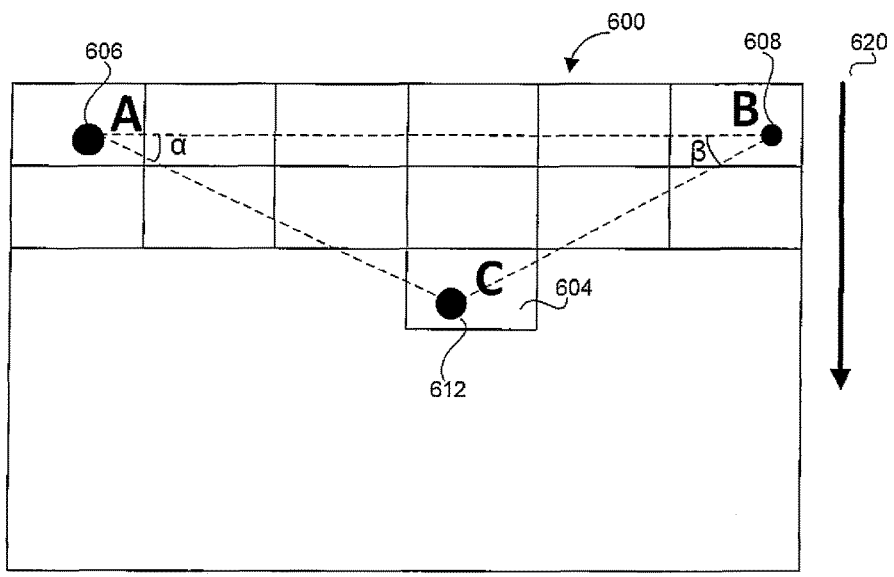
FIG. 6A is a schematic drawing of a non-planar area to be tiled for demonstrating the work flow, in accordance with some embodiments of the disclosure.

Referring now to FIG. 6A, showing a schematic illustration of a situation in which the plane to be tiled is potentially non-horizontal, and potentially non-flat. The disclosure below relates to non-flat surfaces, which are naturally also non-horizontal. Thus, the disclosed embodiments are also operative for any surface, including horizontal or other flat surfaces. In such cases, each tile needs to be placed at the correct location, e.g. at the correct X and Y coordinates, but also at its correct Z coordinate which may be different than that of a neighboring or of any other tile, and at a correct spatial angle. Thus, in some embodiments, a display component may show positioning information showing a tiler the current height and tilt relative to a target position of the tile, wherein in the target position, the height and tilt are determined by the X-Y location of the tile.

A tiler tiling area 600 is working his way as described in association with FIG. 3B above.

When placing each tile, such as tile 604, the tiler has to determine the X-Y location of the tile and its yaw relative to reference coordinates, which can be done by standard measurement techniques. Alternatively, the tiler may place tile 604 at an approximate location, for example adjacent to an already laid tile. The tiler may then place a reader such as reading unit 240 at a known location on tile 604. The reader may be stably located on tile 604 for example using arms as disclosed in association with FIG. 5A above. Reader 244 may be able to move up and down along a shaft of the device and the location of the device on the tile may be such that the tile orientation relatively to the device is known, for example by using the arms to align the device to a center of an edge of the tile, and yawing the device accordingly. The location of tile 604 may then be determined in accordance with two reference points, such as locations 606 and 608, as detailed below, using triangulation. It will be appreciated that distance between any two points may be determined using an ultrasonic emitter/receiver.

Figure 6B:
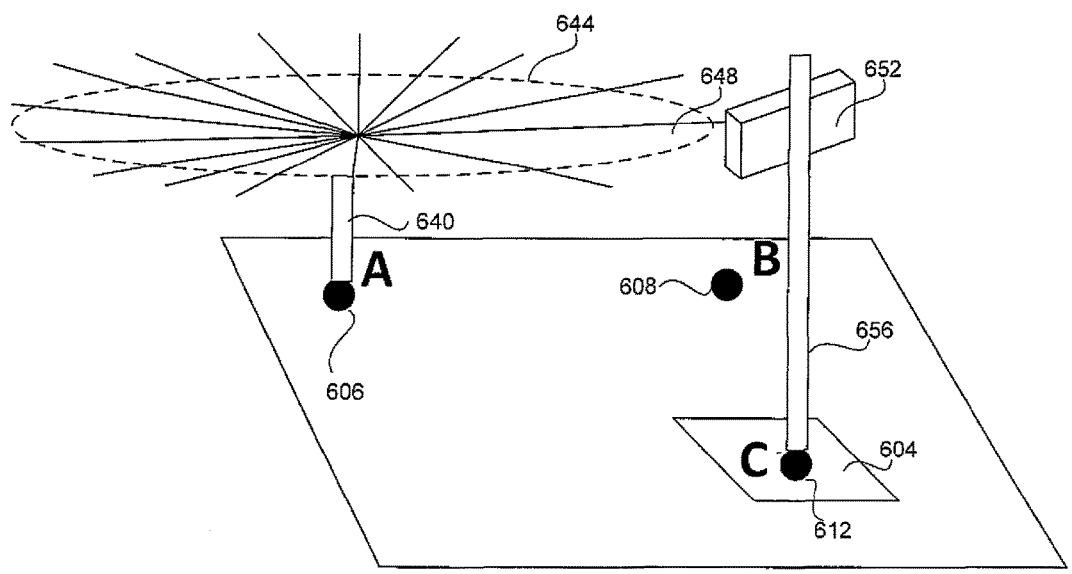
FIG. 6B is a schematic illustration of an apparatus for tiling a non-flat plane.

Referring now to FIG. 6B, showing a schematic illustration of an apparatus used for placing a tile using reference points when tiling a non-flat plane.

A tiler may use two beam emitters such as beam emitter 640 placed at known location such as A (606), each of which may emit a rotating beam. The rotating beam is emitted in directions varying substantially in 360° over a horizontal plane 644. At one direction 648 or at a range of directions, the beam hits reader or sensor 652 located on a shaft positioned on tile 604 being tiled. It will be appreciated that reader 652 may be implemented as the same device as reader 244 disclosed in association with FIG. 2 above. The beam hits reader 652, subject to reader 652 being elevated to the horizontal plane of the rotating beam, or that beam emitter 640 is lowered to the level of reader 652, depending on the inclination direction. The time in which the beam hits the emitter is communicated to the emitter, and the angle at which the emitter is transmitting the beam at that time may be recorded and correlated as the relative angle of the receiver (e.g., angle BAC). The time may be adapted to compensate for the delay associated with the recording and communication. Alternatively, the angle of the beam and the rotation rate may be communicated to the receiver (for example by providing the time at which the beam is at a reference angle), and the beam may be captured at the receiver at the time of the impact. The distance A-C may be measured using means such as a laser distance measuring equipment, a mechanical means such as a measure tape, a combination of the above or any other distance measuring techniques.

In some embodiments, each distance measurement may be performed by a pair of ultrasonic emitter and receiver. The emitter emits a signal which propagates through the air and hits the receiver. The time difference between the emitting time and the receiving time is proportional to the distance between the emitter and receiver. In case where it is required to measure multiple distances, such as A-B and A-C, a single emitter and multiple receivers or multiple emitters and a single receiver may be used.

The distance between the beam origin and tile 604 may then be assessed using the distance between beam emitter 640 and reader 652, and the elevation of beam-emitter 640 relatively to reader 652. The process may then be repeated from a beam emitter located at another location, such as B (608), and obtaining angle ABC. Using the locations of points A (606) and B (608), the distances between each of points A (606) and B (608) and tile 604, and the heights of beam emitter 640 and reader 652, the X and Y coordinates of location 612 of the reader and hence the tile may be determined and compared to the required location.

It will be appreciated that the X and Y coordinates may also be obtained in alternative ways, for example by determining the distance between points A (606) and B (608), and determining angles CAB and CBA. In yet another alternative, the distances may be measured by emitting beams from tile 604 towards points A (606) and B (608), measuring different angles, or otherwise assessing a geometric or trigonometric relationship between reader 652 and beam emitter 640 as described above.

Once the X and Y coordinates are known, the target Z coordinate and the target spatial angle of tile 604 may be obtained from the pre-provided coordinates, by calculating from an engineering model, by querying a server, or the like.

Since a coordinate system may be expressed by the vertical axis of beam emitter 640 and plane 644 in which the emitted beam rotates, then the X, Y and Z coordinates and the spatial angle of tile 604 may be expressed in this coordinate system.

The tiler may spread filling or gluing material around location 612, place tile 604 on the material, and start adjusting the height and spatial angle of the tile.

The spatial angle of the tile may be measured by a gravitation-operated device as described in the discussion preceding FIG. 4A above, and the yaw of the tile as may be determined by the position of the arms on the tile and the sensor orientation toward emitter 200. The angle may be measured relative to two lines, such as two sides of the tile, the intersection of the arms holding shaft 656 of reader 652 relative to the tile, or the like. The height of a tile being tiled may be determined relatively to a known point such as point A (606), by measuring the angle and distance to a known point on beam emitter 640 while optionally taking into account the height of the reader above the tile, in accordance with the reader elevation relatively to the or using any other relevant calculation, as may be appreciated by a person skilled in the art. The measurements can be expressed in any coordinate system, and in particular in the coordinate system expressed by the vertical axis of beam emitter 640 and plane 644 in which the emitted beam rotates.

The deviation between the measurements and the target values of the height and the spatial angle, may then be conveyed to the tiler visually similarly to the display disclosed in association with FIGS. 4A-4E above, using audio signals, or in any other manner. The tiler may thus correct the height and angle of the tile until identical to the target values, or at least deviate from the target values in no more than predetermined thresholds. As suggested with regard to FIG. 3 above, some small deviations may be applied to avoid 'step' effects between adjacent tiles. The apparatus and methods detailed above avoid accumulation of errors as they refer each tile to the location of the emitter or emitters, independently of other tiles.

Changing the height or tilt angle of the tile may change its horizontal location, i.e. its X or Y coordinates upon which the target Z and angle were determined. However, if the surface to be tiled is inclined in up to a small angle, such as below about 15°, this deviation is negligible and may be ignored.

Tiling a non-horizontal or non-flat area may comprise placing a first tile, and then continuing to adjacent tiles. Laying each adjacent tile may comprise: placing the tile at an approximate location; determining the horizontal coordinates of the location at which the tile is located relatively to a known coordinate system; retrieving the height and spatial angle associated with the location; and adjusting the height and the spatial angle of the tile according to obtained readings using the known coordinate system.

Figure 7:
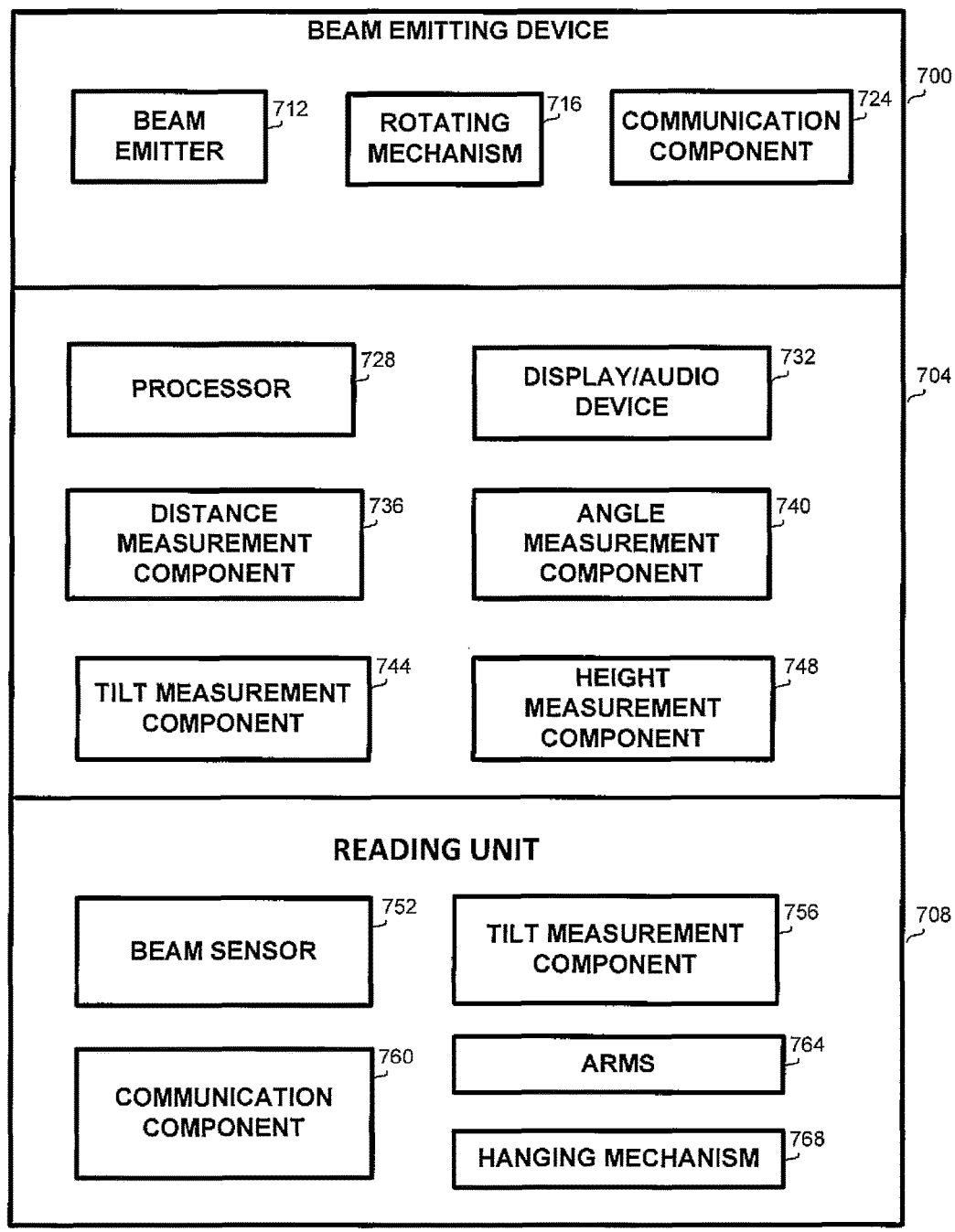
FIG. 7 is a schematic block diagram of the components used in devices for tiling, in accordance with some embodiments of the disclosure.

Referring now to FIG. 7, showing a block diagram of the components in an apparatus for placing tiles. The apparatus generally comprises one or more beam emitters and one or more beam readers, wherein during laying each tile one or more devices are placed at known locations, and one or more devices are placed at a location being tiled. Thus, FIG. 7 shows a specific embodiment of division of required components into: components 700 which are parts of the device located at a known location; components 708 which are parts of the device located at the tiled location; and components 704 which may be located at either device. It will, however, be appreciated that the division is exemplary only and different embodiments may also be designed in which the devices are implemented differently.

Beam emitting device components 700 may include beam emitting component 712, which may emit a horizontal beam and may be used in emitter 200 of FIG. 2. Components 700 may also include beam rotating mechanism 716 for rotating the emitted beam over a horizontal plane. Beam rotating mechanism 716 may be used in emitter 640 used for tiling non-flat surfaces for measuring height or angle. If it is required to measure the height only, rather than the height and angle, a non-rotating beam may be used. The angle may be determined according to the angle at which the beam is emitted at the time it hits the receiver.

Components 700 may further comprise communication component 724 for receiving or transmitting data to or from the device located on the tile to be laid. Corresponding communication component 760 is comprised in components 708. Either communication component may be used for receiving information from an external source, for example description of a surface to be tiled, height and angles for specific horizontal coordinate sets, or the like. Additionally or alternatively, either device may communicate with the other device and for transmitting information therebetween. Additionally or alternatively, either device may comprise a user interface module for receiving such information from a user.

Reading unit components 708 may include beam reader 752, which may receive a beam emitted by beam emitting component 712. Beam reader 752 may be designed to sense and indicate whether the beam is received at a predetermined level, or above or below the level, using for example indicators 260, 264 and 268 of FIG. 2.

Reading unit components 708 may also include tilt measurement component 756 for determining the tilt angle of beam reader 752 relatively to a horizontal plane. In some cases, tilt measurement component 756 may be replaced with a level such as a bubble level.

Reading unit components 708 may further include communication component 760 discussed above, arms 764 for attaching and stabling the device to a tile, such that the relative location of the device to the tile being laid is fixed, or hanging mechanism 768 for attaching and stabling the device to a wall tile.

Each of components 704 detailed below may be implemented as part of beam emitting device components 700, reading unit components 708 or both.

Components 704 may include one or more processors for performing calculations and determining data based upon measurements.

Components 704 may also include distance measurement component 732 for determining distance between two locations using laser based distance measurement equipment; angle measurement component 736 for determining an angle between two lines, relatively to a known line or plane such as a horizontal plane; tilt measurement component 740 for determining a tilt angle of a component relatively to a known direction, for example vertical direction; and height determination component 744 for determining the height of a location relatively to a known location. It will be appreciated that some of components 732, 736, 740 and 744 may be implemented within reading unit components 708 while others may be implemented as part of beam emitting device components 700. Even further, these components may be co-implemented by one or more components.

Components 704 may further include display and/or audio device 748 for indicting to a user whether one or more aspects of laying a tile are correct or should be changed.

It will be appreciated that excluding display and/or audio device 748 which are preferably located on the device placed at the location to be tiled, other components may be divided in a multiplicity of manners between the device at the known location and the device at the tiled location. For example the beam emitter may be located at the known location and beam reader may be located at the tiled location, but reverse positioning is also possible.

Flowchart and block diagrams in the figures illustrate the architecture, functionality, and operation of possible implementations of systems, methods and products according to various embodiments of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or a product comprising a computer program.

Computer program code for carrying out operations of the present invention may be written in any combination of one or more programming languages, including an object oriented programming language such as Java, C#, C++ or the like and conventional procedural programming languages, such as the "C", assembly programming language or similar programming languages. The program code may execute entirely on any of the devices or on an external device or system.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device for positioning a tile, comprising:
   a beam reader for receiving a laser beam from a beam emitter within a predetermined range of locations, the beam reader providing a height indication of the tile;
   a level for providing a tilt indication of a tilt of the device;
   a processor for receiving the height indication from the beam reader, and the tilt indication from the level, and combining the height indication and the tilt indication for determining a gradient and a height of at least one part of the tile; and
   a display component for displaying to a user of the device in at least two dimensions, positioning information for the device, wherein the positioning information relates to the gradient and the height of the at least one part of the tile, as obtained by combining the height indication and the tilt indication,
   wherein the beam being received at a predetermined location within the range of locations, and the level indicating that the device is at a predetermined tilt, provides that the tile is at a required height, and wherein the device is adapted to be stably placed on the tile.

2. The device of claim 1, further comprising kickstands for setting a tilt angle of the device relatively to the tile.

3. The device of claim 1, further comprising at least two arms for setting the device on the tile.

4. The device of claim 3, wherein the at least two arms are extendable.

5. The device of claim 3, wherein each arm of the at least two arms is at least partially surrounded by a rigid sleeve distanced from the arm by a soft ring.

6. The device of claim 1, wherein the level is an electronic level for measuring an angle between the device and a vertical line.

7. The device of claim 6, wherein the predetermined location is adjusted in accordance with the angle.

8. The device of claim 1, wherein the beam reader and level are operating continuously.

9. The device of claim 8, wherein the level is an electronic level for measuring an angle between the device and a vertical line and the predetermined location is adjusted in accordance with the angle.

10. The device of claim 1, further comprising a feedback component for indicating to a tiler whether the device is leveled or whether the beam is received at the predetermined location.

11. The device of claim 10, wherein the feedback is a visual feedback indicating how the tile is to be tilted or an audio feedback indicating whether the tile is at a correct height.

12. The device of claim 1, further comprising a hook for stabilizing the device against the tile, wherein the tile is to be positioned substantially vertical.

13. The device of claim 1, further comprising a beam emitter, wherein the device and the beam emitter are adapted to be calibrated such that the beam emitter emits the beam at the predetermined location.

14. The device of claim 13 further comprising: a beam rotating mechanism for rotating the beam over a horizontal plane; a distance or angle measurement unit for assessing a geometric relationship between the device and the beam emitter, by detecting a time at which the beam hits the reader, and the angle at the time of the hitting; and a height measurement unit for determining a height of the tile.

15. The device of claim 13 wherein each of the device and the beam emitter comprises a communication component for communicating with the beam emitter or the device, respectively, or with an external computing platform.

16. The device of claim 1 wherein a target position of the tile is on a non-flat surface to be tiled.

17. The device of claim 14, wherein the positioning information is relative to a target position of the tile, the target position comprising a height and tilt, the height and tilt depending on a location of the tile within the surface.

18. The device of claim 15, wherein the location of the tile within the surface is determined using triangulation with reference to two points or one point and an angle.

19. The device of claim 16, further comprising an ultrasonic emitter or receiver for determining distance between two points.

20. A device for positioning a tile, comprising:
a beam emitter for emitting a beam;
a beam reader for receiving the beam and determining whether the beam is received at a predetermined height;
a level for determining an angle of the device relatively to a surface the device is placed on;
at least two extendable arms for setting the device on the tile;
a feedback component for providing a visual or auditory feedback to a tiler whether the device is leveled or whether the beam is received at the predetermined height; and
a hook for stabilizing the device against a tile to be positioned substantially vertical.

* * * * *